(12) United States Patent
Wu

(10) Patent No.: US 10,448,369 B2
(45) Date of Patent: Oct. 15, 2019

(54) DEVICE AND METHOD OF HANDLING CYCLIC PREFIXES FOR WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/099,614

(22) Filed: Apr. 15, 2016

(65) Prior Publication Data

US 2016/0309455 A1 Oct. 20, 2016

Related U.S. Application Data

(60) Provisional application No. 62/148,764, filed on Apr. 17, 2015.

(51) Int. Cl.
*H04W 72/04* (2009.01)
*H04L 27/26* (2006.01)

(52) U.S. Cl.
CPC ..... *H04W 72/0406* (2013.01); *H04L 27/2607* (2013.01); *H04L 27/2646* (2013.01); *H04L 27/2678* (2013.01)

(58) Field of Classification Search
CPC ........... H04W 72/0406; H04L 27/2646; H04L 27/2607; H04L 27/2678
See application file for complete search history.

(56) References Cited

U.S. PATENT DOCUMENTS

| 8,483,137 | B2 * | 7/2013 | Lim | H04L 25/03114 370/328 |
| 9,326,152 | B1 * | 4/2016 | Yiu | H04L 5/0073 |
| 2006/0176966 | A1 * | 8/2006 | Stewart | H04L 27/2607 375/260 |
| 2012/0170683 | A1 * | 7/2012 | Frederiksen | H04L 1/1607 375/308 |
| 2013/0022090 | A1 * | 1/2013 | Weng | H04L 25/03343 375/219 |

(Continued)

FOREIGN PATENT DOCUMENTS

WO 2013010247 A1 1/2013

OTHER PUBLICATIONS

Search Report dated Nov. 7, 2016 for EP application No. 16165502.2, pp. 1-7.

(Continued)

*Primary Examiner* — Gbemileke J Onamuti
(74) *Attorney, Agent, or Firm* — Winston Hsu

(57) ABSTRACT

A communication device of handling at least one cyclic prefix (CP) comprises a storage unit for storing instructions and a processing means coupled to the storage unit. The processing means is configured to execute the instructions stored in the storage unit. The instructions comprise performing a first communication operation with a BS according to at least one first CP which has at least one first format; receiving a control signal indicating at least one second CP which has at least one second format or indicating no CP from the BS, wherein the at least one first format is different from the at least one second format; and performing a second communication operation with the BS according to the at least one second CP or using no CP according to the control signal.

18 Claims, 9 Drawing Sheets

(56) References Cited

U.S. PATENT DOCUMENTS

2014/0233437 A1   8/2014   Abdoli

OTHER PUBLICATIONS

Thorsten Wild et al., "5G air interface design based on Universal Filtered (UF-)OFDM", Aug. 20-23, 2014, pp. 699-704, Proceedings of the 19th International Conference on Digital Signal Processing, IEEE, XP032644097.
5GNOW: non-orthogonal, asynchronous waveforms for future mobile applications, IEEE Communications Magazine Year: 2014, vol. 52, Issue: 2 pp. 97-105, Feb. 2014.
3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
A simple approach to near-optimal multiuser detection: interleave-division multiple-access, Wireless Communications and Networking, 2003. WCNC 2003. 2003 IEEE Year: 2003, vol. 1 pp. 391-396 vol. 1.
Behrouz Farhang-Boroujeny, "OFDM Versus Filter Bank Multicarrier", IEEE Signal Processing Magazine, vol. 28, May 2011, p. 92-112.
Vida Vakilian et al., "Universal-Filtered Multi-Carrier Technique for Wireless Systems Beyond LTE", 9th Int'l. Wksp. Broadband Wireless Access, IEEE GLOBECOM '13, Atlanta, GA, Dec. 2013, p. 223-228.
Office Action dated Apr. 17, 2018 for EP application No. 16165502.2, pp. 1-5.

\* cited by examiner

DEVICE AND METHOD OF HANDLING CYCLIC PREFIXES FOR WIRELESS COMMUNICATION SYSTEM

CROSS REFERENCE TO RELATED APPLICATIONS

This application claims the benefit of U.S. Provisional Application No. 62/148,764, filed on Apr. 17, 2015, which is incorporated herein by reference.

BACKGROUND OF THE INVENTION

1. Field of the Invention

The present invention relates to a communication device and a method used in a wireless communication system, and more particularly, to a communication device and a method of handling a cyclic prefixes for a wireless communication system.

2. Description of the Prior Art

A long-term evolution (LTE) advanced (LTE-A) system includes advanced techniques, such as carrier aggregation, licensed-assisted access (LAA) using LTE, etc. The LTE-A system employs orthogonal frequency-division multiplexing (OFDM) with cyclic prefix(es) (CP(s)) as a transmission scheme for downlink (DL) transmission and single-carrier frequency-division multiple access (SC-FDMA) with CP(s) as a transmission scheme for uplink (UL) transmission. However, it is not known what transmission scheme(s) for the UL transmission and the DL transmissions will be used in a 5G system developed by 3GPP.

SUMMARY OF THE INVENTION

The present invention therefore provides devices for handling CPs with various formats to solve the abovementioned problem.

A communication device of handling at least one cyclic prefix (CP) comprises a storage unit for storing instructions and a processing means coupled to the storage unit. The processing means is configured to execute the instructions stored in the storage unit. The instructions comprise performing a first communication operation with a BS according to at least one first CP which has at least one first format; receiving a control signal indicating at least one second CP which has at least one second format or indicating no CP from the BS, wherein the at least one first format is different from the at least one second format; and performing a second communication operation with the BS according to the at least one second CP or using no CP according to the control signal.

A base station of handling at least one cyclic prefix (CP) comprises a storage unit for storing instructions and a processing means coupled to the storage unit. The processing means is configured to execute the instructions stored in the storage unit. The instructions comprise performing a first communication operation with a communication device according to at least one first CP which has at least one first format; transmitting a control signal indicating at least one second CP which has at least one second format or indicating no CP to the communication device, wherein the at least one first format is different from the at least one second format; and performing a second communication operation with the communication device according to the at least one second CP or using no CP according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
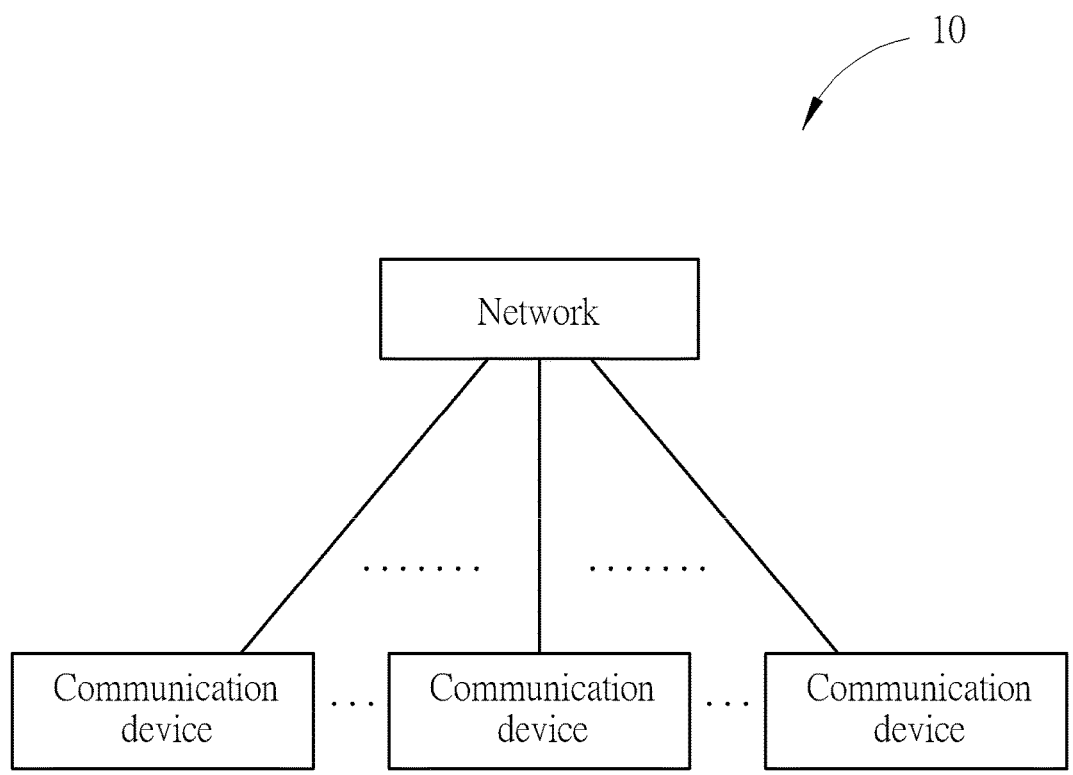
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved universal mobile telecommunication system Terrestrial Radio Access Network (E-UTRAN) including at least one evolved Node-B (eNB), or may be a 5G network including at least one 5G base station (BS) which employs orthogonal frequency-division multiplexing (OFDM) and/or non-OFDM for communication with the communication devices. In general, a BS may also be used to refer any of the eNB and the 5G BS.

A communication device may be a user equipment (UE), a machine type communication (MTC) device, a mobile phone, an electronic book, a portable computer system, a vehicle, or aircraft. In addition, for an uplink (UL), the communication device is the transmitter and the network is the receiver, and for a downlink (DL), the network is the transmitter and the communication device is the receiver.

Figure 2:
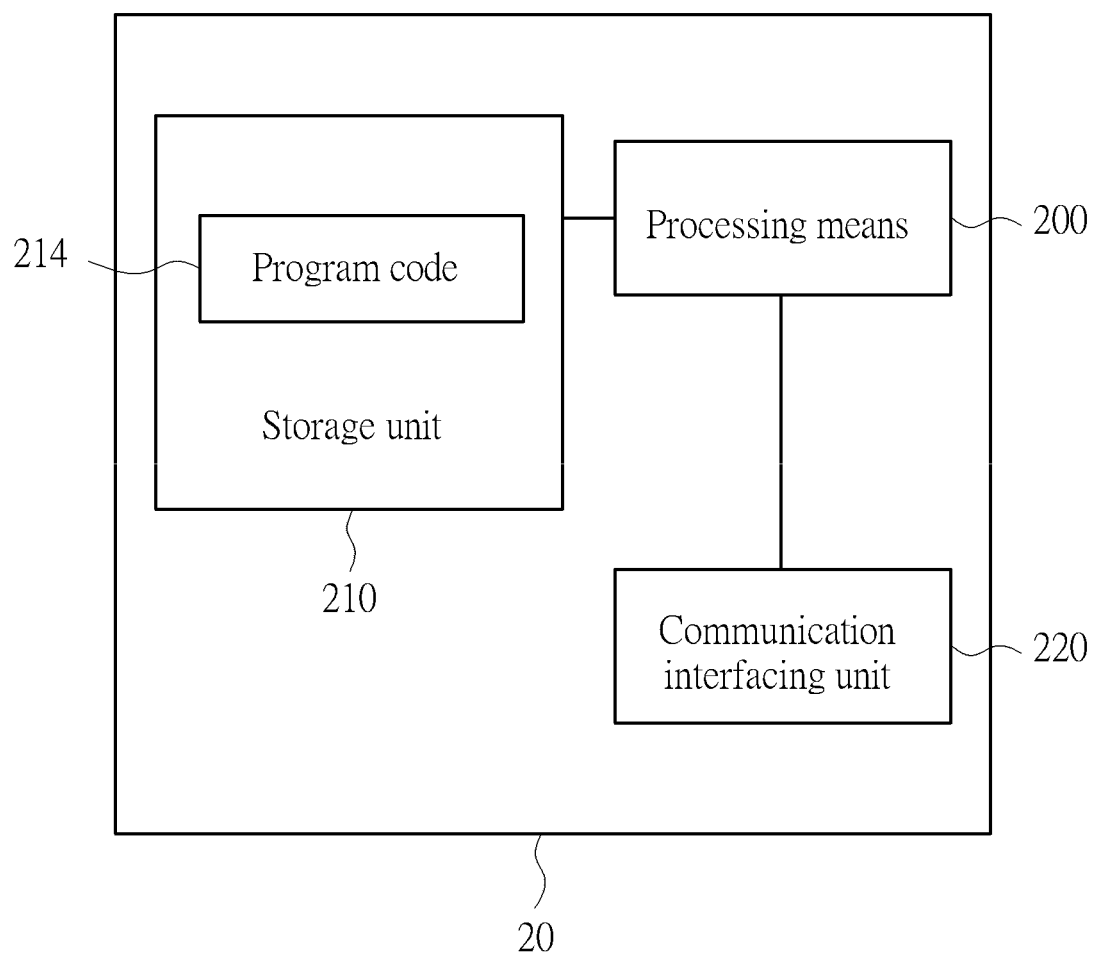
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

In the following embodiments, a UE is used to represent a communication device in FIG. 1 to simplify the illustration of the embodiments.

Figure 3:
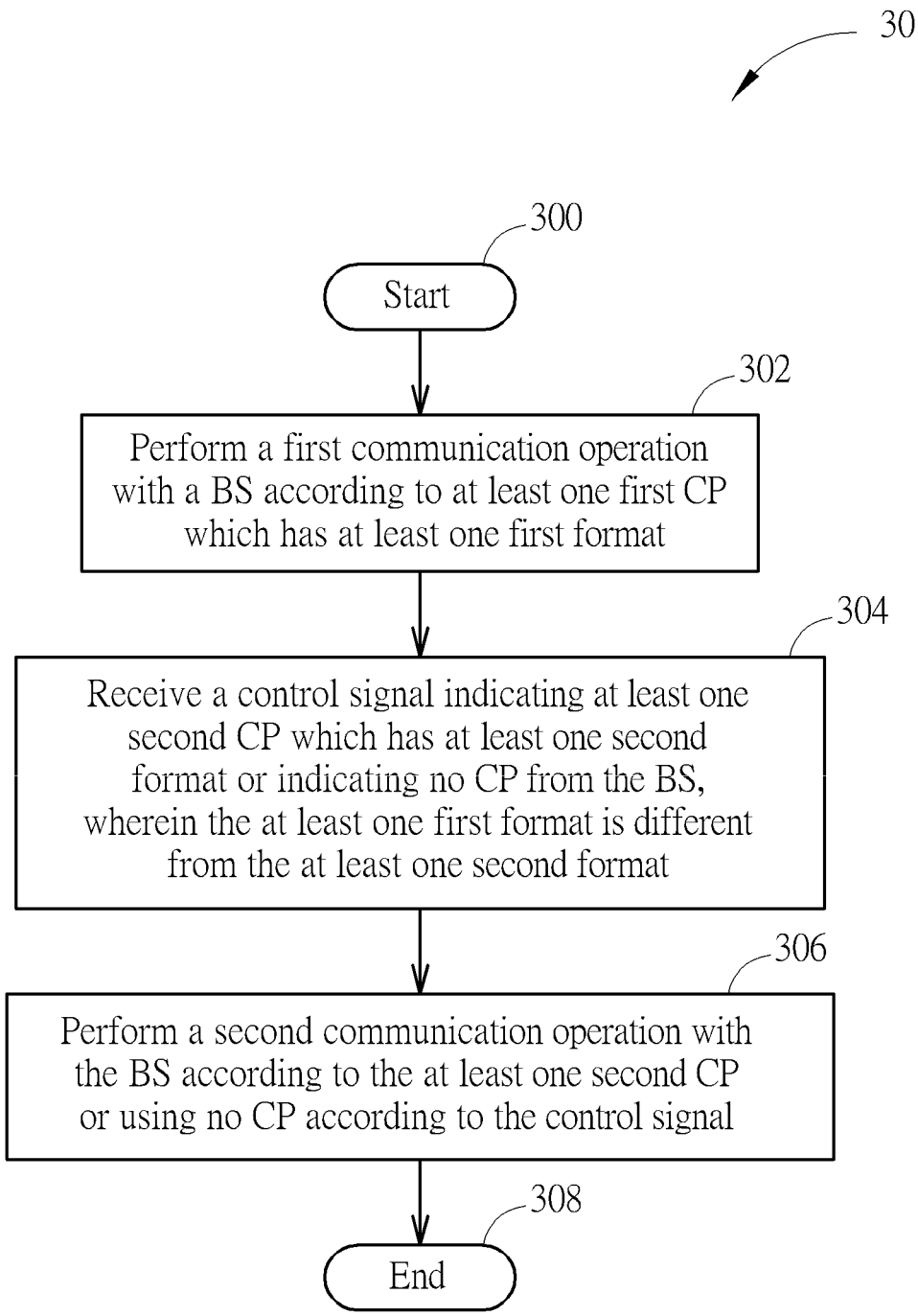
FIG. 3 is a flowchart of a process according to an example of the present invention.

FIG. 3 is a flowchart of a process 30 according to an example of the present invention. The process 30 may be utilized in a UE, to handle at least one cyclic prefix (CP). The process 30 may be compiled into the program code 214 and includes the following steps:

Step 300: Start.

Step 302: Perform a first communication operation with a BS according to at least one first CP which has at least one first format.

Step 304: Receive a control signal indicating at least one second CP which has at least one second format or indicating no CP from the BS, wherein the at least one first format is different from the at least one second format.

Step 306: Perform a second communication operation with the BS according to the at least one second CP or using no CP according to the control signal.

Step 308: End.

According to the process 30, the UE may initiate a first communication operation with a BS according to at least one first CP which has at least one first format. Then, the UE may receive a control signal indicating at least one second CP which has at least one second format or indicating no CP from the BS, wherein the at least one first format is different from the at least one second format. Accordingly, the UE may perform a second communication operation with the BS according to the at least one second CP or using no CP according to the control signal. That is, at the beginning of the communication, the UE communicates with the BS by using the at least one first CP. The UE can communicate with the BS by using the at least one second CP or without using any CP, after receiving the control signal. Thus, the UE can communicate with the BS regularly, because the rule for switching the use of the CP can be determined according to the process 30.

Realization of the process 30 is not limited to the above description.

An example is illustrated according to the process 30 as follows. A BS transmits a first DL transmission by using a first set of CPs with first format(s) in a first timeslot (or a first subframe). Correspondingly, the UE receives the first DL transmission from the BS by using the first set of CPs with the first format(s) in the first timeslot (or the first subframe). The UE transmits a first UL transmission to the BS by using the first set of CPs with the first format(s) in a second timeslot (or a second subframe). Then, the BS may transmit a control signal for indicating the UE to use a second set of CPs with second format(s) for a third timeslot (or a third subframe). Accordingly, the UE transmits a second UL transmission by using the second set of CPs with the second format(s) in the third timeslot (or the third subframe) according to the control signal, or receives a second DL transmission by using the second set of CPs with the second format(s) in the third timeslot (or the third subframe) according to the control signal. The above format(s) may be length(s) of the CP(s), or may be the number of the CP(s) (e.g., m CPs) within n symbols. For example, the second format(s) may be length(s) of the second set of CPs, and are different from the first format(s) which may be the length(s) of the first set of CPs. For example, different format(s) may be different m values and/or different n values. Multiple symbols may share a CP, if a non-orthogonal waveform is used for the symbols. The non-orthogonal waveform may be generated according to a universal filtered multi-carrier (UFMC) depending on a filter length.

The first DL transmission may include any information such as data and/or control information, and is not limited herein. For example, the first DL transmission may include system information which includes at least one of a cell identity, DL bandwidth configuration, UL bandwidth configuration, random access configuration, cell reselection configuration, frequency band information. After the UE receives the system information, the UE may tune its radio frequency (RF) receiver according to the DL bandwidth configuration, may tune its RF transmitter according to the UL bandwidth configuration, may perform random access according to the random access configuration, may perform cell reselection according to the cell reselection configuration, or may determine a frequency band supported by the BS according to the frequency band information. In one example, the first DL transmission may include a data packet (e.g., Medium Access Control (MAC) Protocol Data Unit (PDU)). In one example, the first DL transmission may be transmitted in a DL slot/subframe/frame including a plurality of OFDM symbols or a plurality of non-OFDM symbols, wherein the CP(s) (e.g., the first set of CPs and/or the second set of CPs) with the corresponding format(s) is inserted into the plurality of OFDM symbols or the plurality of non-OFDM symbols.

The first UL transmission may include any information such as data and/or control information, and is not limited herein. For example, the first UL transmission may include a preamble for a random access or a MAC PDU including an Internet Protocol (IP) packet. In another example, the first UL transmission may be transmitted in a UL slot/subframe/frame including a plurality of OFDM symbols or a plurality of non-OFDM symbols, wherein the CP(s) (e.g., the first set of CPs and/or the second set of CPs) with the corresponding format(s) is inserted into the plurality of OFDM symbols or the plurality of non-OFDM symbols.

The control signal may be any message such as a radio resource control (RRC) message, a MAC control element in a MAC PDU, a MAC control PDU or a physical layer signaling (e.g., DL control information), and is not limited herein. In addition, the control signal may indicate the second format(s) of the second set of CP, filter length(s) and/or subband bandwidth(s) (e.g., for the UFMC). The second format(s) of the second set of CP, the filter length(s) and/or the subband bandwidth(s) may be separately or jointly indicated in the control signal. In addition, the control signal may further indicate a modulation and coding scheme (MCS). The UE may generate the second UL transmission according to the control signal, or may process the second DL transmission according to the control signal. The control signal may also indicate a timeslot/subframe number to which the second format(s) or no CP is applied.

The BS may determine content of the control signal according to a capability of the UE, wherein the capability may include the second format(s) of the second set of CP, the filter length(s), the subband bandwidth(s), and/or the MCS. In this situation, the UE may transmit the capability to the BS, e.g., before step 304. Besides the capability, the BS may determine the second format(s) of the second set of CP, the filter length(s), and/or the subband bandwidth(s) according to measurement result(s) (e.g., measurement value(s)) indicating signal strength(s), signal quality(ies), and/or channel state(s)/quality(ies). The measurement result(s) may be obtained by the BS, or may be received from the UE.

In one example, the BS may determine no CP, a short CP or fewer CPs for the second UL transmission, if the measurement result(s) indicates that UL channel(s)/frequency (ies)/subband(s)/subcarrier(s) is good enough (e.g., the measurement results(s) is greater than threshold(s)). Similarly, the BS may determine no CP, a short CP or fewer CPs for the second DL transmission, if the measurement results(s) indicates that DL channel(s)/frequency(ies)/subband(s)/subcarrier(s) is good enough. In another example, the BS may determine a filter length/subband bandwidth for the second UL transmission, if the measurement result(s) indicates that UL channel(s)/frequency(ies)/subband(s)/subcarrier(s) is good enough (e.g., the measurement results(s) is greater than threshold(s)). Similarly, the BS may determine a filter length/subband bandwidth for the second DL transmission, if the measurement result(s) indicates that DL channel(s)/frequency(ies)/subband(s)/subcarrier(s) is good enough.

If the UE does not receive the control signal, the UE may use the first set of CPs with the first format(s) for receiving the second DL transmission or for transmitting the second UL transmission.

In one example, the first communication operation may be performed via a first part of a bandwidth (e.g., at a carrier frequency), and the second communication operation may be performed via a second part of the bandwidth. An example can be illustrated jointly with the process 30 as follows. A BS transmits a synchronization signal, a reference signal and/or system information in the first part of the bandwidth by using the at least one first CP. Correspondingly, a UE receives the synchronization signal, the reference signal and/or the system information in the first part of the bandwidth by using the at least one first CP. Then, the BS transmits a control signal in the first part of the bandwidth by using the at least one first CP. The control signal indicates use of the at least one second CP, or indicates no CP for the second part of the bandwidth. Correspondingly, the UE receives the control signal by using the at least one first CP. Thus, the UE can apply the at least one second CP to communicate with the BS via the second part of the bandwidth according to the control signal.

The UE may simultaneously communicate with the BS in the first part of the bandwidth by using the at least one first CP, and in the second part of the bandwidth by using the at least one second CP or no CP according to the control signal.

The system information mentioned above may include a frequency band indicator, a system bandwidth, cell information, a random access configuration, etc. Control information including a RRC configuration, MAC PDU(s)/element(s), a hybrid automatic repeat request (HARQ) feedback may also be transmitted in the first part of the bandwidth, because a reliable transmission is needed for the system information and/or the control information. Data packets such as IP packets may be transmitted in the second part of the bandwidth.

Figure 4:
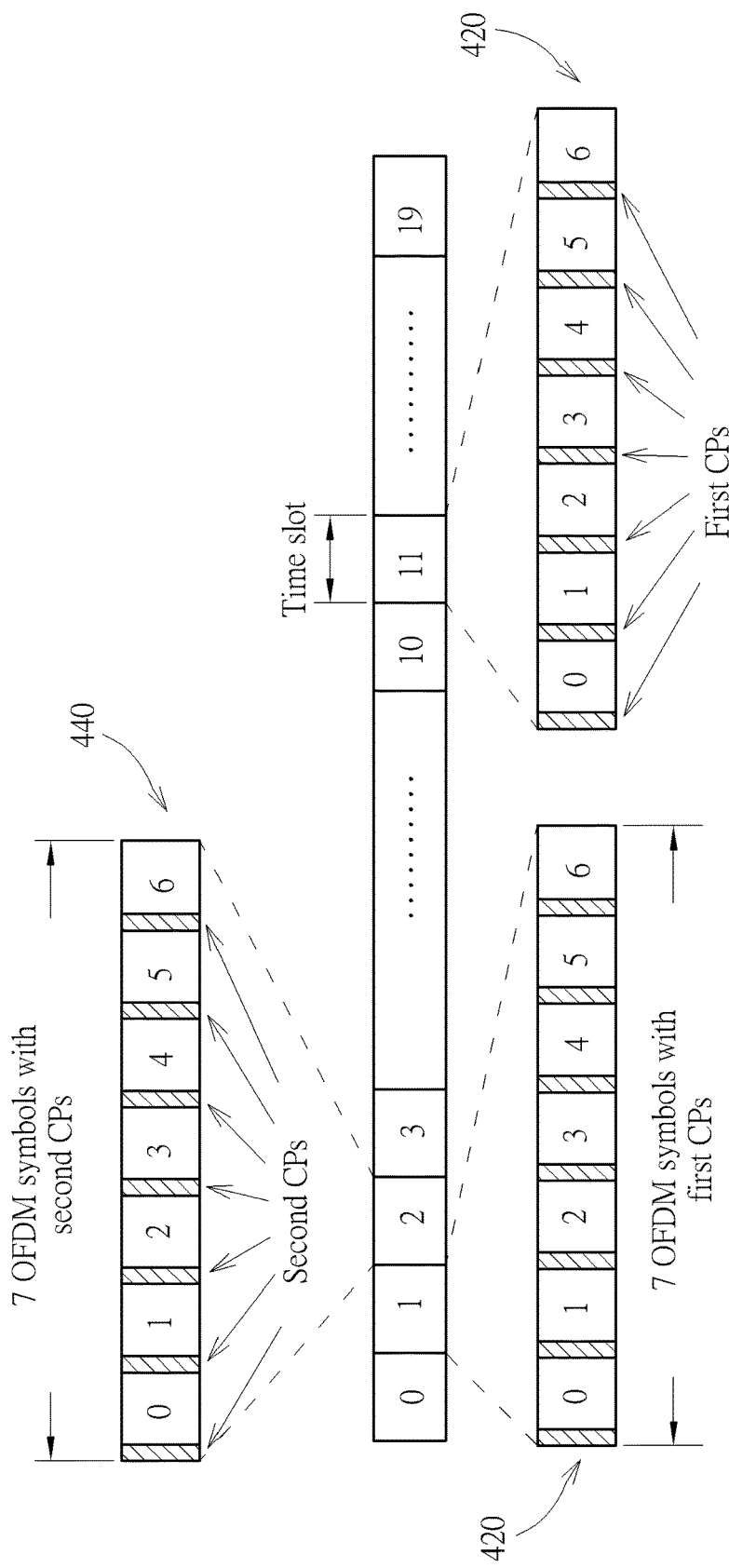
FIG. 4 is a schematic diagram of OFDM symbols with CPs according to an example of the present invention.

FIG. 4 is a schematic diagram of OFDM symbols with CPs according to an example of the present invention. A time slot 420 may include multiple OFDM symbols, and CPs of first format(s) are inserted in the OFDM symbols. A time slot 440 may include multiple OFDM symbols, and CPs of second format(s) are inserted in the OFDM symbols. A UE/BS may transmit the time slot 420 and/or the time slot 440 to the BS/UE. The UE and the BS may know positions of the time slots 420 and 440, so the UE and the BS know which format(s) is applied to the CPs. In one example, the positions may be represented by frame numbers, subframe numbers and/or time slot numbers which are configured by the BS or specified in a standard. In one example, the UE/BS may know about the position of the time slot 440 according to information received in the time slot 420. In one example, the first two OFDM symbols in each of the time slot 420 and/or 440 may be used by the UE/BS for transmitting control signal(s) which indicates which format(s) is applied to the CPs of the rest OFDM symbols.

Figure 5:
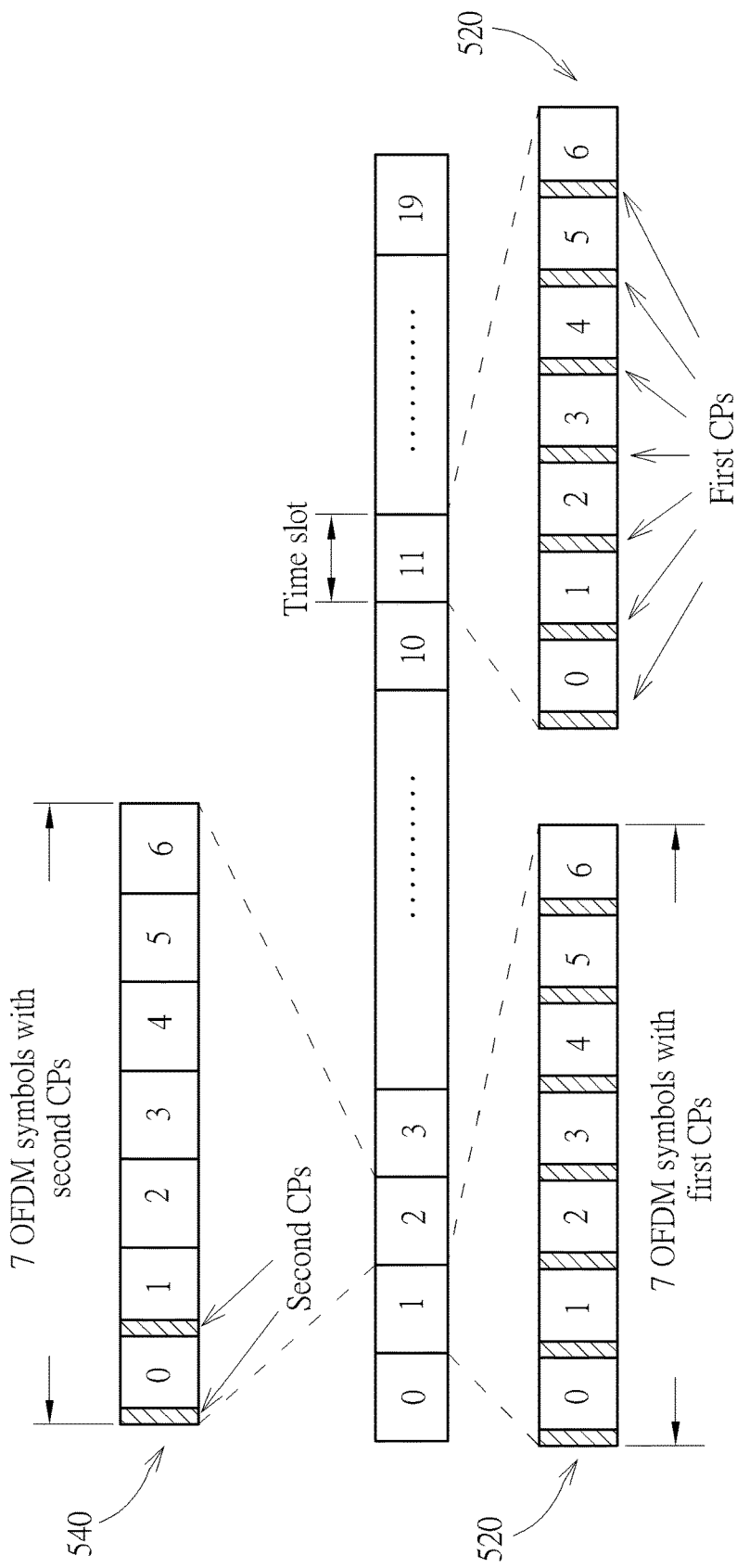
FIG. 5 is a schematic diagram of OFDM symbols with CPs according to an example of the present invention.

FIG. 5 is a schematic diagram of OFDM symbols with CPs according to an example of the present invention. A time slot 520 may include multiple OFDM symbols, and CPs of first format(s) are inserted in the OFDM symbols. A time slot 540 may include multiple OFDM symbols, and CPs of second format(s) are inserted in the first two OFDM symbols. A UE/BS may transmit the time slot 520 and/or the time slot 540 to the BS/UE. The UE and the BS may know positions of the time slots 520 and 540, so the UE and the BS knows only 2 CPs are inserted in the first 2 OFDM symbols and no CP is inserted in the rest five OFDM symbols. In one example, the positions may be represented by frame numbers, subframe numbers and/or time slot numbers which are configured by the BS or specified in a standard. In one example, the UE/BS may know about the position of the time slot 540 according to information received in the time slot 520. In one example, the first two OFDM symbols in the time slot 520 and/or 540 may be used by the UE/BS for transmitting control signal(s) which indicates which no CPs is applied to the rest OFDM symbols.

Figure 6:
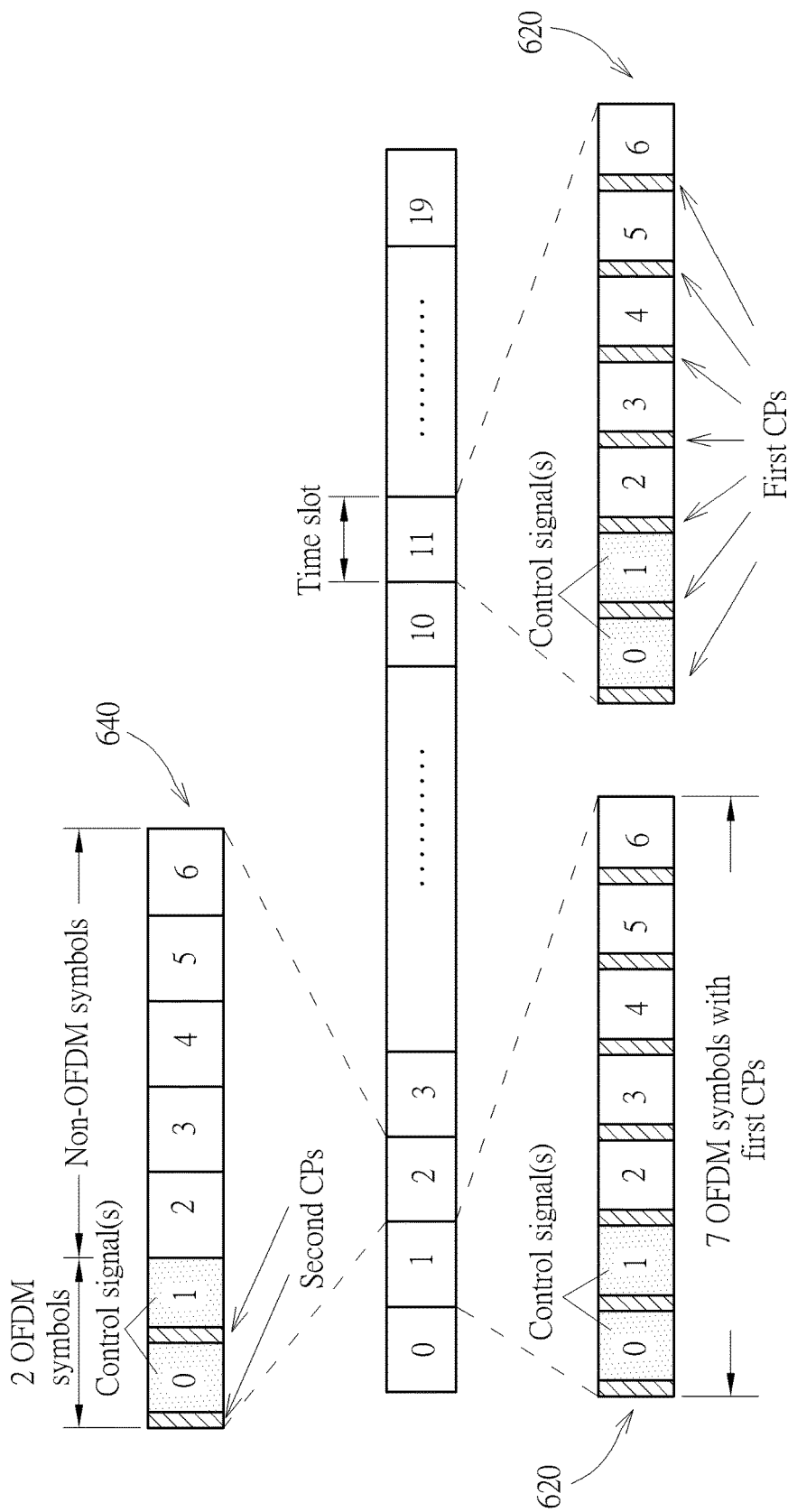
FIG. 6 is a schematic diagram of OFDM symbols with CPs and non-OFDM symbols according to an example of the present invention.

FIG. 6 is a schematic diagram of OFDM symbols with CPs and non-OFDM symbols according to an example of the present invention. A UE/BS may transmit the time slot 620 and/or the time slot 640 to the BS/UE. The UE and the BS may know positions of the time slots 620 and 640, so the UE and the BS knows only 2 CPs are inserted in the first 2 OFDM symbols and no CP is inserted in the rest five symbols. In one example, the positions may be represented by frame numbers, subframe numbers and/or time slot numbers. In one example, the UE/BS may know about the position of the time slot 640 according to information received in the time slot 620. In one example, the first two OFDM symbols in the time slot 620 and/or 640 may be used by the UE/BS for transmitting control signal(s) indicating that no CP is applied to the rest five symbols. The control signal(s) may include filter length(s) and/or subband bandwidth(s). Accordingly, the UE/BS may apply the filter length(s) and/or the subband bandwidth(s) to demodulate/decode the non-OFDM symbols for a UFMC operation. The information or the control signal(s) may indicate that the rest five symbols are OFDM symbols (i.e., the time slot 640 in FIG. 5) or non-OFDM symbols (i.e., the time slot 740 in FIG. 6).

Figure 7:
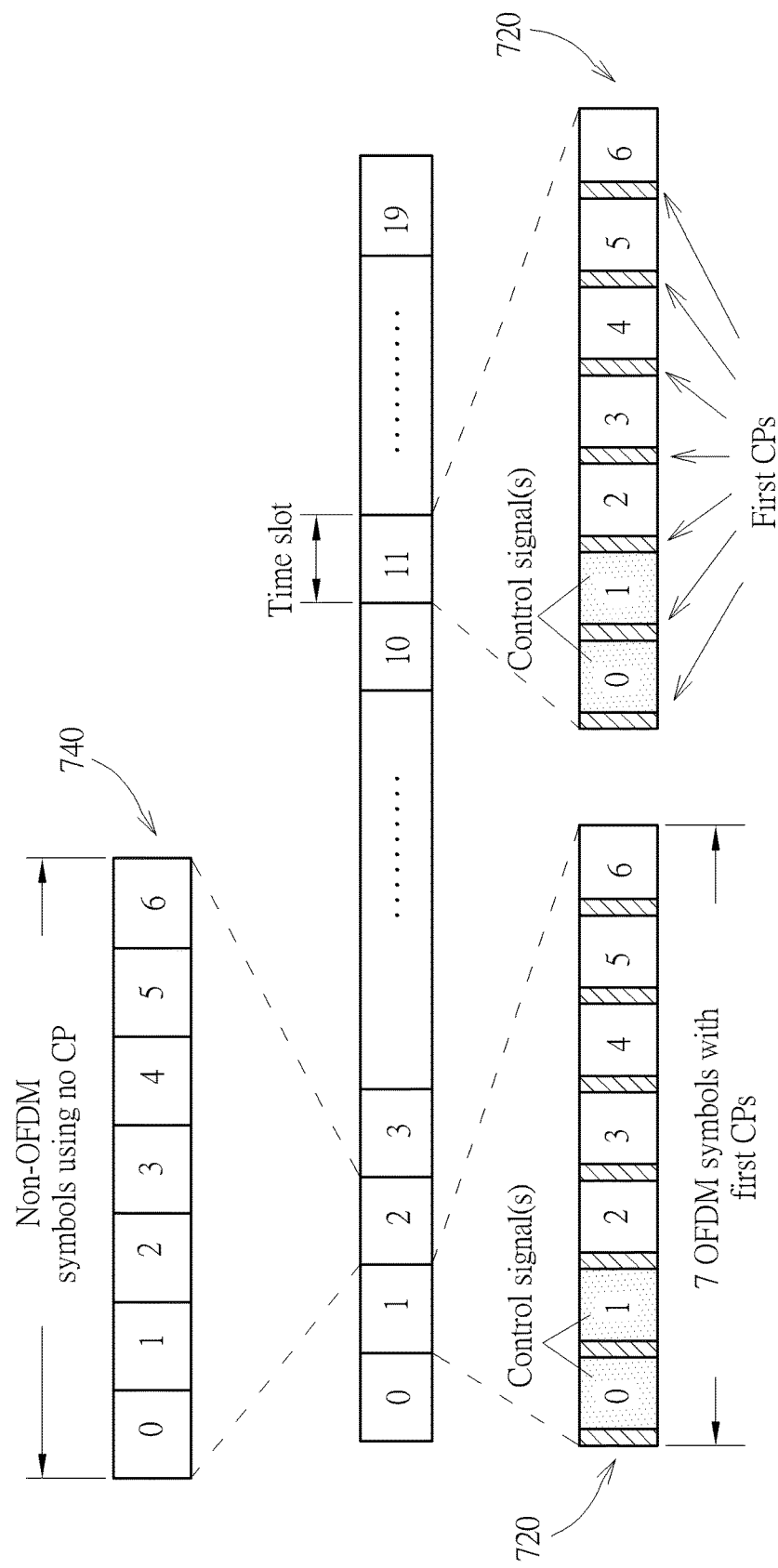
FIG. 7 is a schematic diagram of OFDM symbols with CPs and non-OFDM symbols according to an example of the present invention.

FIG. 7 is a schematic diagram of OFDM symbols with CPs and non-OFDM symbols according to an example of the present invention. A UE/BS may transmit the time slot 720 and/or the time slot 740 to the BS/UE. The UE and the BS may know positions of the time slots 720 and 740, so the UE and the BS knows no CP is inserted in the time slot 740. In one example, the positions may be represented by frame numbers, subframe numbers and/or time slot numbers which are configured by the BS or specified in a standard. In one example, the UE/BS may know about the position of the time slot 740 according to information received in the time slot 720. In one example, the first two OFDM symbols in the time slot 720 may be used by the UE/BS for transmitting control signal(s) indicating that no CP is applied to the time slot 740. The information or the control signal(s) may include filter length(s) and/or subband bandwidth(s).

Accordingly, the UE/BS may apply the filter length(s) and/or the subband bandwidth(s) to demodulate/decode the non-OFDM symbols for a UFMC operation. The information or the control signal(s) may indicate that the time slot 740 include OFDM symbols with CPs or non-OFDM symbols.

The time slot 420/520/620/720 may be used for transmitting system information or control information (e.g., radio resource configuration), and the time slot 440/540/640/740 may be used for transmitting data such as a MAC PDU. The "time slot" is used as a unit for illustrating the examples above, and the examples can be applied to other time units such as "subframe".

Figure 8:
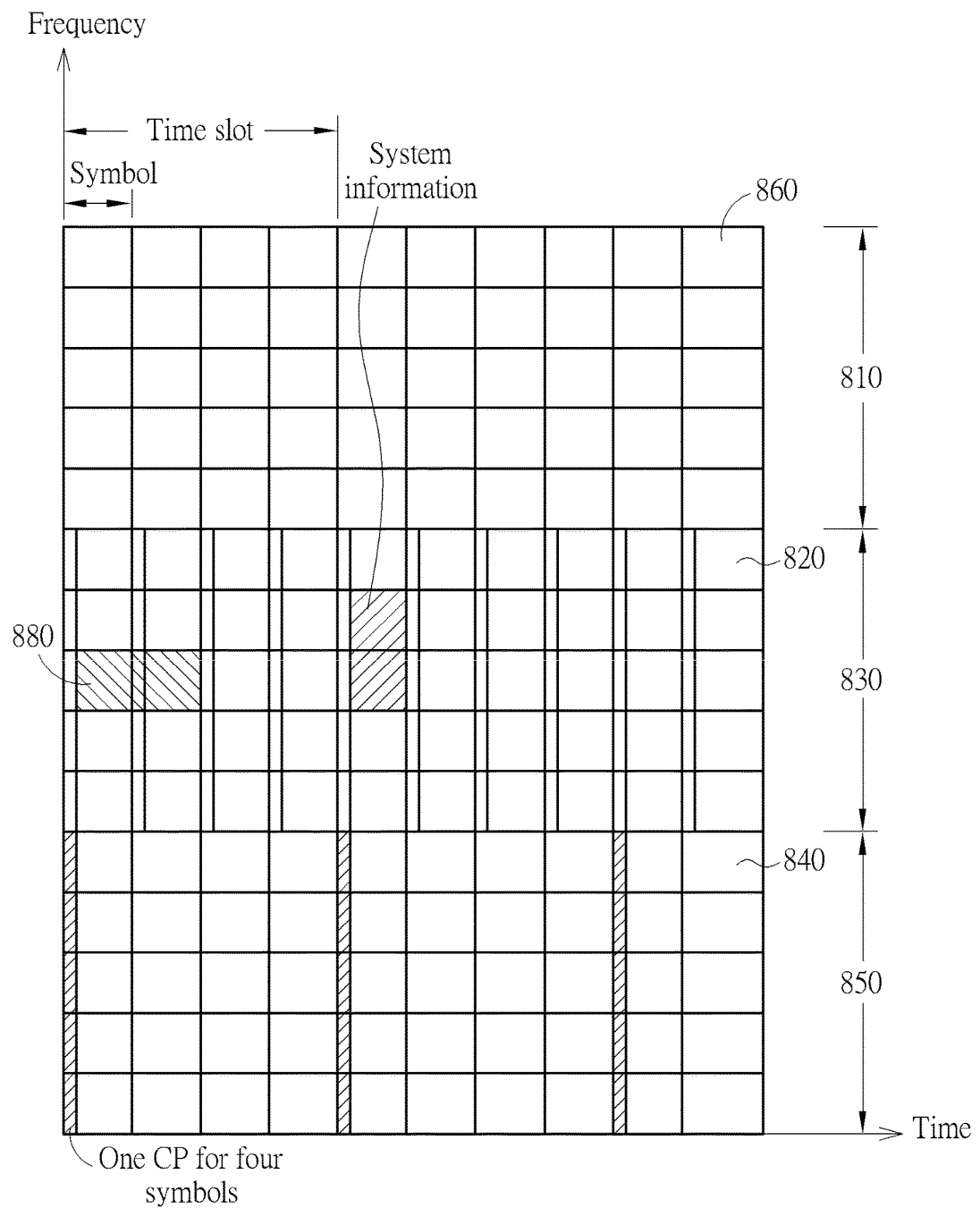
FIG. 8 is a schematic diagram of OFDM symbols with/ without CPs and non-OFDM symbols according to an example of the present invention.

FIG. 8 is a schematic diagram of OFDM symbols with/without CPs and non-OFDM symbols according to an example of the present invention. A UE/BS may transmit blocks 820, 840 and/or 860 to the BS/UE. The UE may initially receive a first part of spectrum, i.e., frequencies 830, and decode/demodulate the OFDM symbols which have CPs inserted. The UE and the BS may know positions of the blocks 820. In one example, the UE/BS may know about the positions of the blocks 840 and/or 860 according to information received in the block 820 in the time slot (e.g., control signal 880). The control signal indicates that one CP is applied to a part of bandwidth 850 in the time slot, or indicates that no CP is applied to a part of bandwidth 810 in the time slot. The control signal may include filter length(s) and/or subband bandwidth(s). Accordingly, the UE/BS may apply the filter length(s) and/or the subband bandwidth(s) to demodulate/decode the non-OFDM symbols for a UFMC or FBMC (Filter Bank Multicarrier) operation.

Figure 9:
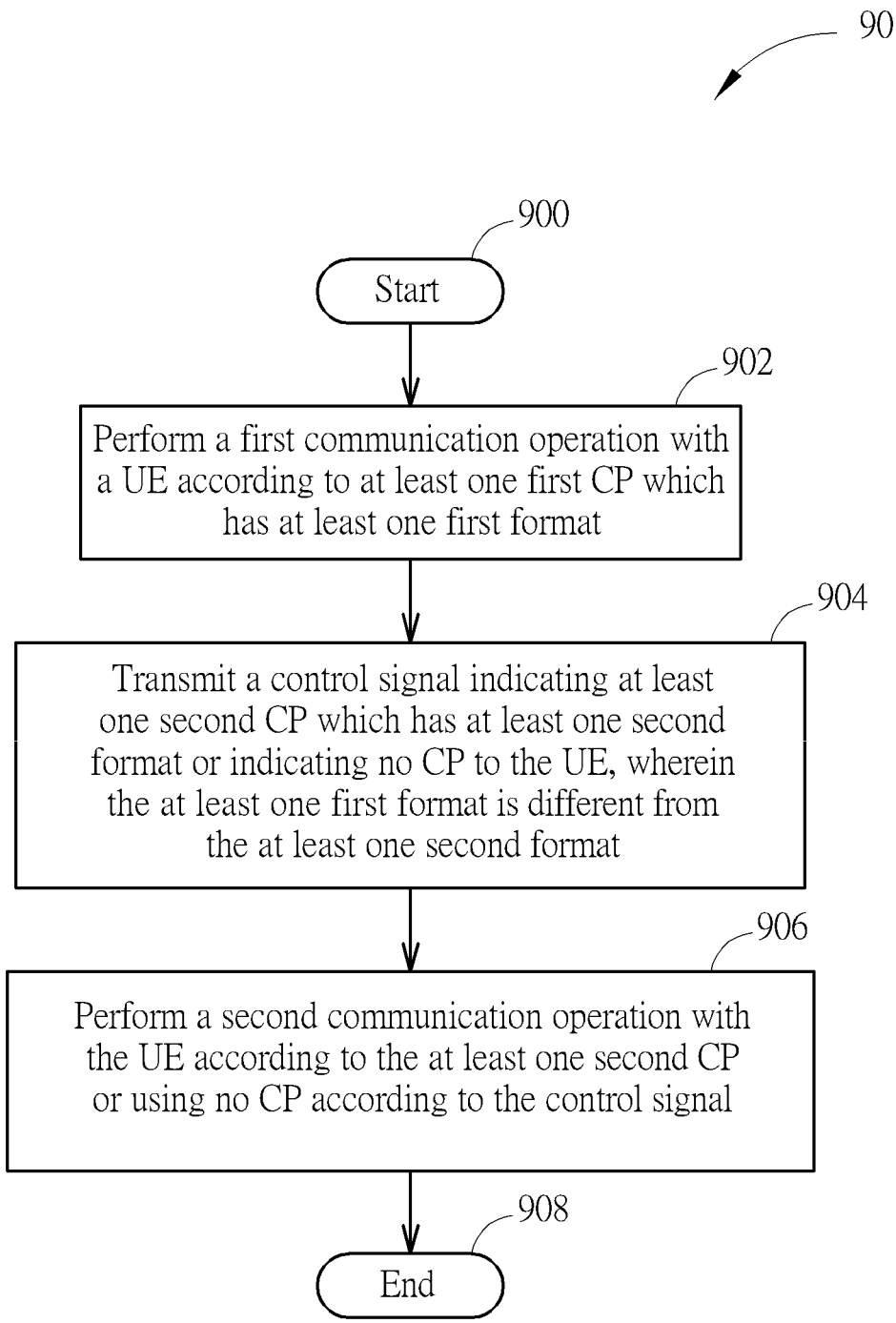
FIG. 9 is a flowchart of a process according to an example of the present invention.

FIG. 9 is a flowchart of a process 90 according to an example of the present invention. The process 90 may be utilized in a BS, to handle at least one CP. The process 90 may be compiled into the program code 214 and includes the following steps:

Step 900: Start.

Step 902: Perform a first communication operation with a UE according to at least one first CP which has at least one first format.

Step 904: Transmit a control signal indicating at least one second CP which has at least one second format or indicating no CP to the UE, wherein the at least one first format is different from the at least one second format.

Step 906: Perform a second communication operation with the UE according to the at least one second CP or using no CP according to the control signal.

Step 908: End.

The process 90 may be realized by the BS to communicate with the UE realizing the process 30. Detailed operations and variations of the process 90 can be referred to the previous description, and are not narrated herein.

In addition, the BS may transmit the control signal, because the BS is going to transmit data of a type to the UE or the BS knows that the UE has data of a type to transmit, e.g., by receiving a buffer status report from the UE which indicates the data of the type is available. Moreover, according to the previous example, the BS may simultaneously communicate with the UE in the first part of the bandwidth by using the at least one first CP with the at least one first format, and in the second part of the bandwidth by using the at least one second CP with the at least one second format or no CP according to the control signal.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, a UE and a BS can dynamically use CP(s) with various format(s) for communicating with each other according to the present invention. The UE and the BS can dynamically use various filter length(s) or subband bandwidth(s) for communicating with each other when using UFMC. An abovementioned control signal indicating the format(s) of the CP(s) may be replaced by a control signal indicating a filter length and/or a subband bandwidth. For example, at least one first CP with at least one first format may be replaced by a first filter length and/or a first subband bandwidth, and at least one second CP with at least one second format may be replaced by a second filter length and/or a second subband bandwidth. Furthermore, the UE and the BS may communicate with each other by simultaneously using OFDM symbols with CPs with various formats or by using OFDM and non-OFDM in different time slots and/or different parts of a bandwidth (e.g., at a carrier frequency). The UE/BS may transmit reference signal(s) in OFDM symbols for the BS/UE to measure signal strength(s)/quality(ies). The OFDM symbols or non-OFDM symbols above may be transmitted via orthogonal waveforms or non-orthogonal waveforms.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling at least one cyclic prefix (CP), comprising:
    a storage device, for storing instructions of:
    performing a first communication operation with a base station (BS) according to at least one first CP which has at least one first format;
    performing a second communication operation with the BS according to the at least one second CP or using no CP, if receiving a control signal indicating at least one second CP which has at least one second format or indicating no CP from the BS, wherein the control signal is received according to the at least one first CP and the at least one first format is different from the at least one second format;
    performing the second communication operation with the BS according to the at least one first CP, if the control signal is not received; and
    a processing circuit, coupled to the storage unit, configured to execute the instructions stored in the storage unit.

2. The communication device of claim 1, wherein the at least one first format of the at least one first CP comprises at least one first length of the at least one first CP; or the at least one second format of the at least one second CP comprises at least one second length of the at least one second CP.

3. The communication device of claim 1, wherein the at least one first format of the at least one first CP comprises a first number of the at least one first CP; or the at least one second format of the at least one second CP comprises a second number of the at least one second CP.

4. The communication device of claim 1, wherein the control signal further indicates at least one filter length and/or at least one subband bandwidth for the second communication operation.

5. The communication device of claim 1, wherein the second communication operation comprises a universal filtered multi-carrier (UFMC) operation.

6. The communication device of claim 1, wherein the first communication operation or the second communication operation comprises at least one transmission of at least one OFDM symbol and/or at least one non-OFDM symbol.

7. The communication device of claim 1, wherein the first communication operation is performed via a first part of a bandwidth, the control signal is received via the first part of the bandwidth, and the second communication operation is performed via a second part of the bandwidth.

8. A base station (BS) of handling at least one cyclic prefix (CP), comprising:
a storage device, for storing instructions of:
performing a first communication operation with a communication device according to at least one first CP which has at least one first format;
transmitting a control signal by using the at least one first CP, wherein the control signal indicates at least one second CP which has at least one second format or indicating no CP to the communication device, and the at least one first format is different from the at least one second format; and
performing a second communication operation with the communication device according to the at least one second CP or using no CP according to the control signal; and
a processing circuit, coupled to the storage unit, configured to execute the instructions stored in the storage unit.

9. The BS of claim 8, wherein the control signal is determined according to a capability of the communication device.

10. The BS of claim 8, wherein the at least one second format of the at least one second CP is determined according to a measurement result obtained by the BS or received from the communication device.

11. The BS of claim 8, wherein the first communication operation comprises an uplink (UL) transmission or a downlink (DL) transmission; or the second communication operation comprises another UL transmission or another DL transmission.

12. The BS of claim 8, wherein the at least one first format of the at least one first CP comprises at least one first length of the at least one first CP; or the at least one second format of the at least one second CP comprises at least one second length of the at least one second CP.

13. The BS of claim 8, wherein the at least one first format of the at least one first CP comprises a first number of the at least one first CP; or the at least one second format of the at least one second CP comprises a second number of the at least one second CP.

14. The BS of claim 8, wherein the control signal further indicates at least one filter length and/or at least one subband bandwidth for the second communication operation.

15. The BS of claim 8, wherein the second communication operation comprises a universal filtered multi-carrier (UFMC) operation.

16. The BS of claim 8, wherein the first communication operation or the second communication operation comprises at least one transmission of at least one OFDM symbol and/or at least one non-OFDM symbol.

17. The BS of claim 8, wherein the first communication operation is performed via a first part of a bandwidth, the control signal is transmitted via the first part of the bandwidth, and the second communication operation is performed via a second part of the bandwidth.

18. A communication device of handling at least one cyclic prefix (CP), comprising:
a storage device, for storing instructions of:
receiving a first transmission from a BS via a first part of a bandwidth according to at least one first CP which has at least one first format;
receiving a control signal indicating at least one second CP which has at least one second format or indicating no CP from the BS, wherein the control signal is received according to the at least one first CP and the at least one first format is different from the at least one second format;
receiving a second transmission from the BS via a second part of the bandwidth according to the at least one second CP or using no CP according to the control signal; and
a processing circuit, coupled to the storage unit, configured to execute the instructions stored in the storage unit.

* * * * *